United States Patent [19]
Hsu

[11] Patent Number: 5,814,945
[45] Date of Patent: Sep. 29, 1998

[54] LIGHTING FIXTURE CONTROL DEVICE

[76] Inventor: Keen Hsu, Fl. 11, No. 195, Ning Hsia Rd., Taichung, Taiwan

[21] Appl. No.: 951,720

[22] Filed: Oct. 16, 1997

[51] Int. Cl.$^6$ ........................................................ F21V 23/00
[52] U.S. Cl. ........................... 315/156; 315/159; 362/276; 362/802
[58] Field of Search ................................ 315/159, 156, 315/158, 149, 150, 151; 362/276, 802, 239, 240; 250/239, 214 AL, 342

[56] References Cited

U.S. PATENT DOCUMENTS 5,442,177  8/1995  Boulos et al. .
5,575,557  11/1996  Huang et al. ............................ 362/276

Primary Examiner—Benny Lee
Assistant Examiner—David H. Vu
Attorney, Agent, or Firm—Peterson,Wicks,Nemer & Kamrath, P.A.

[57] ABSTRACT

A lighting fixture control device has a base casing, an upper cover covering the base casing, an arc-shaped lens disposed on the base casing, an electric circuit board disposed on a bottom of the upper cover, and a control integrated circuit chip disposed on a bottom of the electric circuit board. The arc-shaped lens collects and focuses light. The electric circuit board has a photo-field-effect transistor to detect an approaching article. The arc-shaped lens reflects light to the photo-field-effect transistor to actuate the electric circuit board.

7 Claims, 4 Drawing Sheets

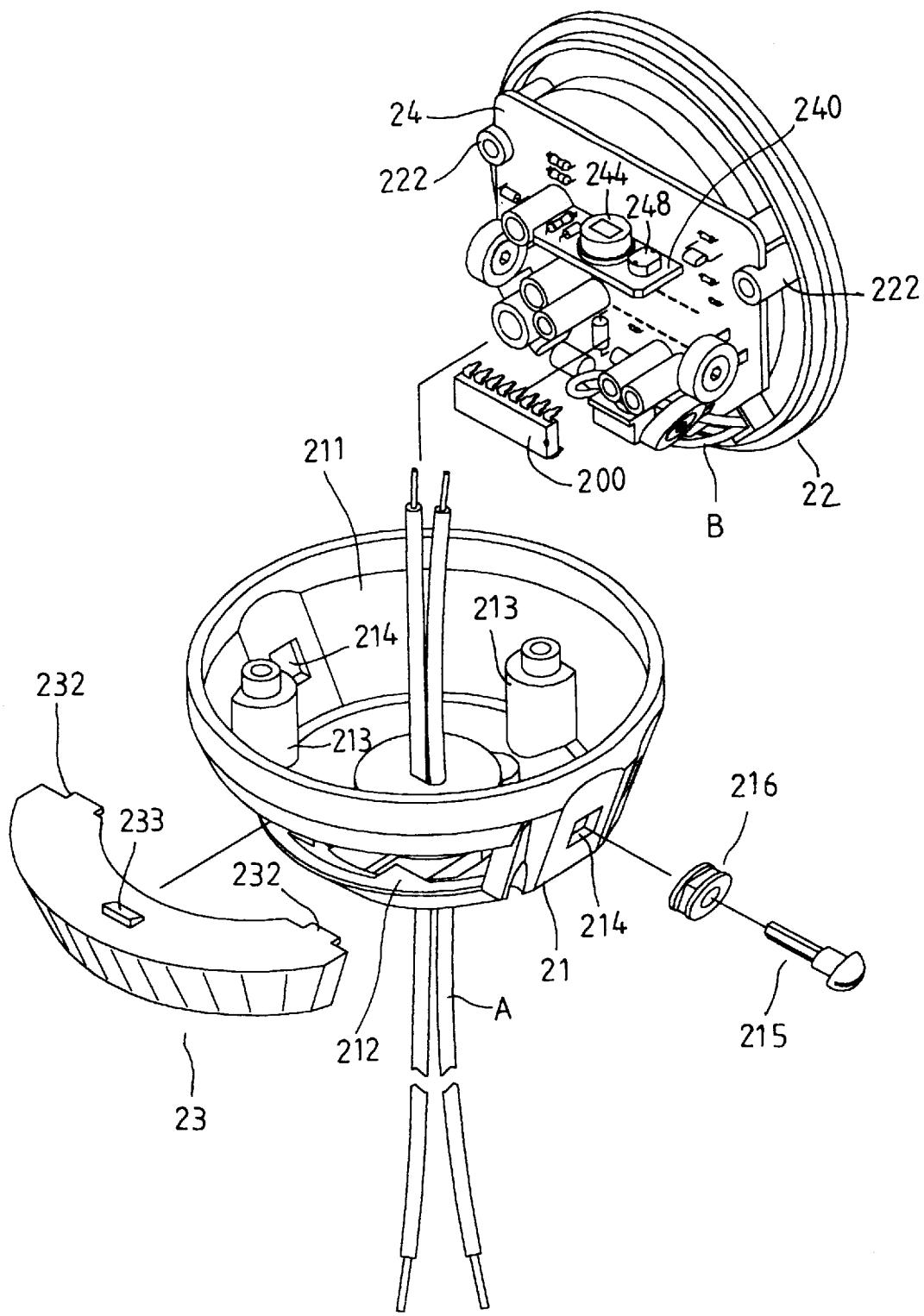
F I G. 3 the LIGHTING FIXTURE CONTROL DEVICE

BACKGROUND OF THE INVENTION

The present invention relates to a lighting fixture control device. More particularly, the present invention relates to a lighting fixture control device which can initiate a lighting fixture automatically.

U.S. Pat. No. 5,282,118 discloses a lighting fixture with an integral motion detector. Referring to FIG. 1, a conventional lighting fixture body 10 comprises a motion detector housing 14, a lighting fixture 12 disposed on the motion detector housing 14, a bulb 13 disposed in the lighting fixture 12, a decorative tail piece 15, and a mounting portion 11 supporting the conventional lighting fixture body 10. A lens 141 is disposed on the motion detector housing 14. However, the length C from the motion detector housing 14 to a distal end of the decorative tail piece 15 is too long. A transformer device is disposed in the mounting portion 11. A photosensitive circuit is disposed in the motion detector housing 14. The photosensitive circuit comprises a light depending resistor to initiate the whole photosensitive circuit, and a phototransistor to detect an approaching article in order to determine whether the bulb 13 should be initiated or not. Since the lens 141 reflects light to the phototransistor, the angle and position of the lens 141 should be arranged precisely. The amount of photoenergy reaching the phototransistor will determine whether the photosensitive circuit should be initiated or not. When the lens 141 is adhered on the motion detector housing 14, the lens 141 may not be adhered on the predetermined position exactly. Since the lens 141 has an arc shape, the shape of the motion detector housing 14 may not fit the shape of the lens 141 precisely so that the reflection of light may be deflected. Furthermore, the transformer device and the photosensitive circuit are separated too far to increase the complexity of fitting.

SUMMARY OF THE INVENTION

An object of the present invention is to provide a lighting fixture control device which can initiate a lighting fixture automatically.

Another object of the present invention is to provide a lighting fixture control device which occupies a small room.

Accordingly, a lighting fixture control device of the present invention comprises a base casing, an upper cover covering the base casing, an arc-shaped lens disposed on the base casing, an electric circuit board disposed on a bottom of the upper cover, and a control integrated circuit chip disposed on a bottom of the electric circuit board. The arc-shaped lens can collect and focus light. The electric circuit board has a photo-field-effect transistor to detect an approaching article. The arc-shaped lens reflects light to the photo-field-effect transistor to actuate the electric circuit board.

In accordance with an embodiment of the present invention, a lighting fixture control device comprises a base casing, an upper cover, an arc-shaped lens, an electric circuit board disposed on a bottom of the upper cover, and a control integrated circuit chip disposed on a bottom of the electric circuit board. The base casing has a hollow interior, an arc-shaped slot formed on a periphery of the base casing matching the arc-shaped lens, two through holes formed on the periphery of the base casing, and a plurality of hollow seats disposed in a bottom of the base casing. Two main wires pass through the bottom of the base casing connected to the electric circuit board. The upper cover has an aperture formed on a top rim of the upper cover and a plurality of hollow posts disposed on a bottom of the upper cover matching the hollow seats. Two branch wires pass through the aperture connected to the electric circuit board. The arc-shaped lens is inserted in the arc-shaped slot. Each of the through holes receives a cushion which receives an adjustment bolt. The adjustment bolt adjusts the sensitivity and the sensitive distance of the lighting fixture control device. The arc-shaped lens has a protrusion and two distal protruded plates inserted in the arc-shaped slot. The control integrated circuit chip has a first pin, a second pin, a third pin, a fourth pin, a fifth pin, a sixth pin, a seventh pin, an eighth pin, a ninth pin, a tenth pin, an eleventh pin, a twelfth pin, a thirteenth pin, a fourteenth pin, a fifteenth pin, and a sixteenth pin. The electric circuit board has a photo-field-effect transistor, a power supply circuit to commutate an AC source, filtrate the AC source, and divide a voltage of the AC source in order to convert the AC source to a DC source, a triac switch connected to the second pin, the photo-field-effect transistor connected to a photosensitive circuit, the photosensitive circuit connected to the ninth pin, the eleventh pin, the twelfth pin, the thirteenth pin and the fourteenth pin, a distance/sensitivity adjustment circuit connected to the fifteenth pin and the sixteenth pin, a time adjustment circuit connected to the third pin and the fourth pin, a light-depending resistor connected to the sixth pin, the light-depending resistor belonging to a light actuation circuit, and the light actuation circuit actuating the whole circuit. The arc-shaped lens reflects light to the photo-field-effect transistor to actuate the electric circuit board. The triac switch turns on a lamp. The distance/sensitivity adjustment circuit has a first variable resistor adjusting the photosensitive distance and sensitivity of the photosensitive circuit. The time adjustment circuit has a second variable resistor adjusting the actuation period of the triac switch. The light actuation circuit has a third variable resistor adjusting the actuation period and mode of the light actuation circuit.

BRIEF DESCRIPTION OF THE DRAWINGS

FIG. 3 is a perspective assembly view of a lighting fixture control device of a preferred embodiment in accordance with the present invention.

DETAILED DESCRIPTION OF THE INVENTION

Figure 1:
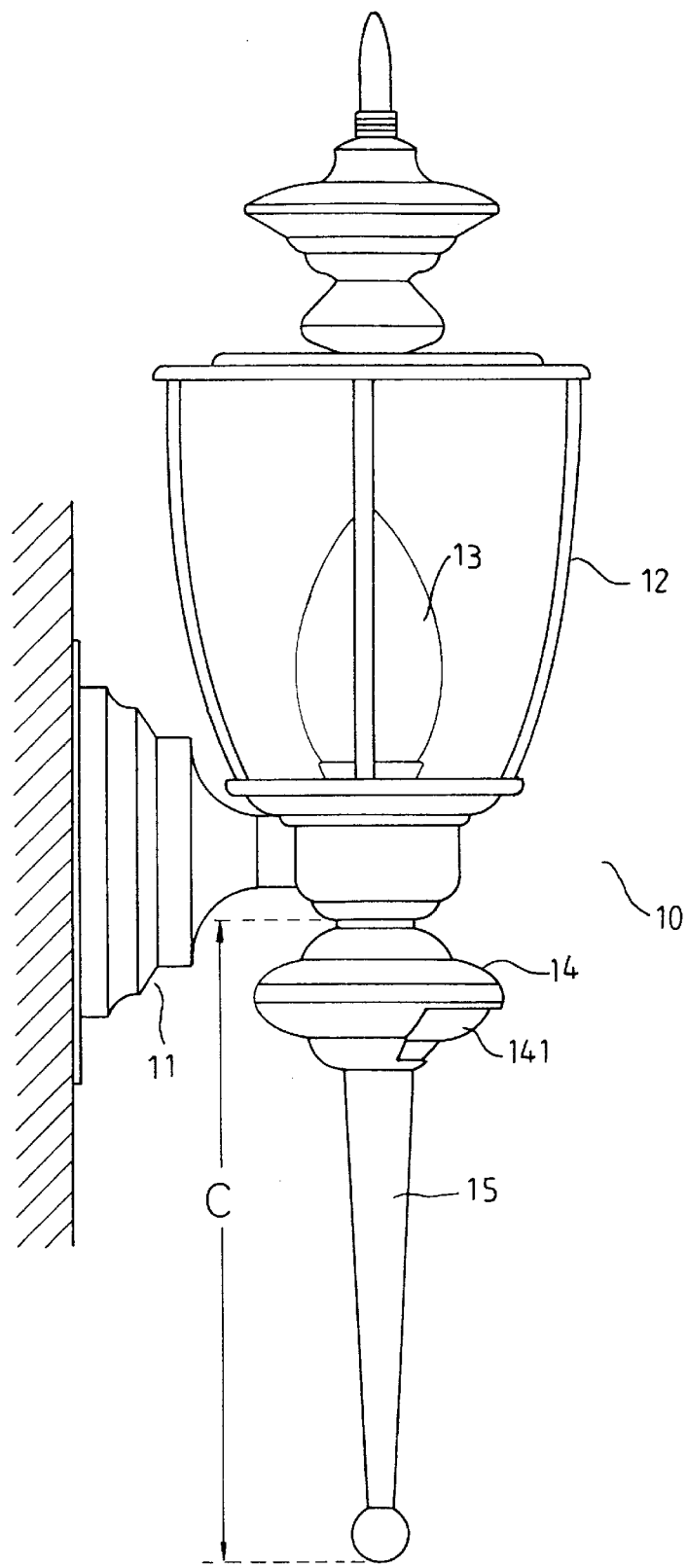
FIG. 1 is a perspective view of a conventional lighting fixture body of the prior art.
Figure 2:
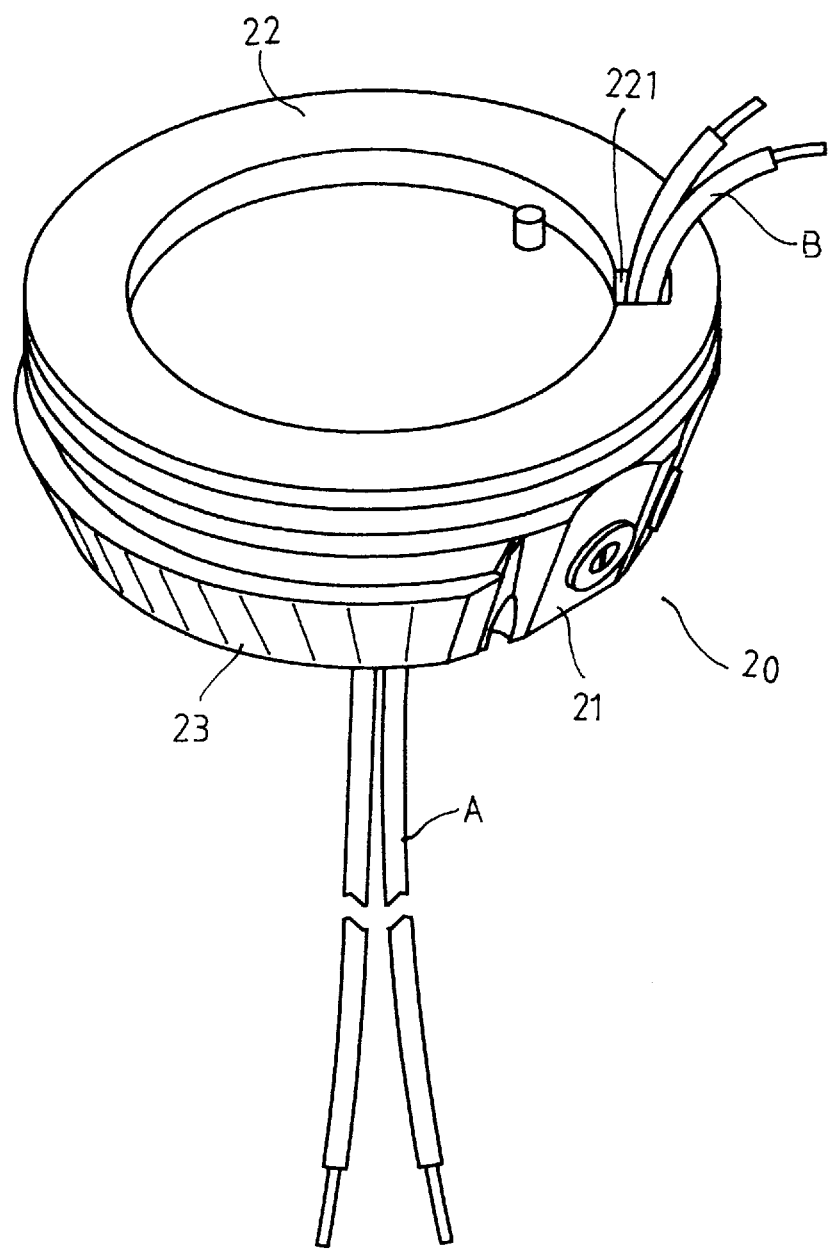
FIG. 2 is a perspective exploded view of a lighting fixture control device of a preferred embodiment in accordance with the present invention.
Figure 4:
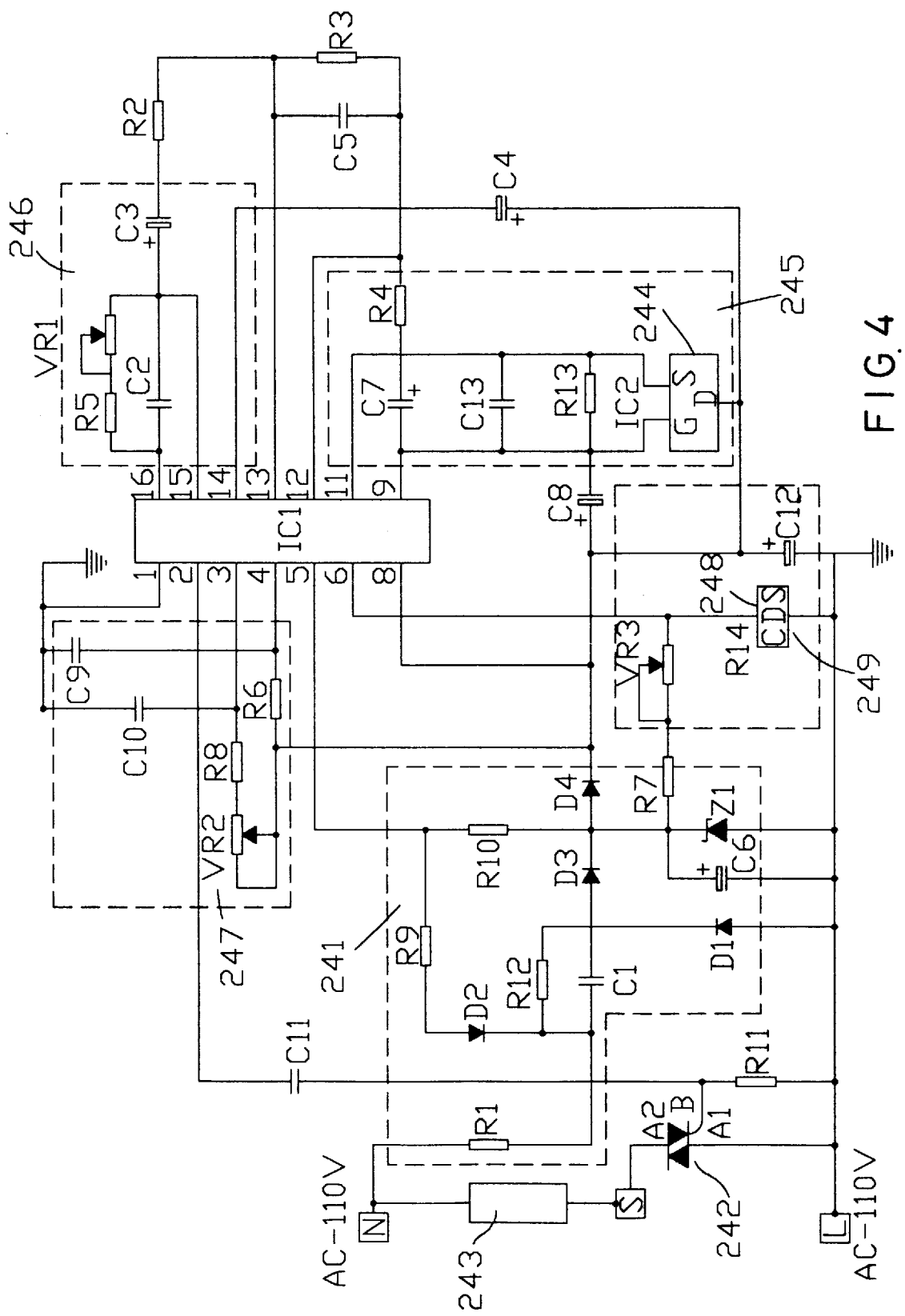
FIG. 4 is a schematic circuit diagram of an electric control circuit.

Referring to FIGS. 2 to 4, a lighting fixture control device 20 comprises a base casing 21, an upper cover 22 covering the base casing 21, an arc-shaped lens 23 disposed on the base casing 21, an electric circuit board 24 disposed on a bottom of the upper cover 22, and a control integrated circuit chip 200 disposed on a bottom of the electric circuit board 24. The arc-shaped lens 23 can collect and focus light.

The base casing 21 has a hollow interior 211, an arc-shaped slot 212 formed on a periphery of the base casing 21 matching the arc-shaped lens 23, two through holes 214 formed on the periphery of the base casing 21, and a plurality of hollow seats 213 disposed in a bottom of the base casing 21. Two main wires A pass through the bottom of the base casing 21 connected to the electric circuit board 24.

The upper cover 22 has an aperture 221 formed on a top rim of the upper cover 22 and a plurality of hollow posts 222 disposed on a bottom of the upper cover 22 matching the hollow seats 213. Two branch wires B pass through the aperture 221 connected to the electric circuit board 24.

The arc-shaped lens 23 is inserted in the arc-shaped slot 212. Each of the through holes 214 receives a cushion 216 which receives an adjustment bolt 215. The adjustment bolt 215 can adjust the sensitivity and the sensitive distance of the lighting fixture control device 20.

The arc-shaped lens 23 has a protrusion 233 and two distal protruded plates 232 inserted in the arc-shaped slot 212.

The control integrated circuit chip 200 has a first pin 1, a second pin 2, a third pin 3, a fourth pin 4, a fifth pin 5, a sixth pin 6, a seventh pin, an eighth pin 8, a ninth pin 9, a tenth pin, an eleventh pin 11, a twelfth pin 12, a thirteenth pin 13, a fourteenth pin 14, a fifteenth pin 15, and a sixteenth pin 16.

The electric circuit board 24 has a photo-field-effect transistor 244 to detect an approaching article, a power supply circuit 241 to commutate an AC source, filtrate the AC source, and divide a voltage of the AC source in order to convert the AC source to a DC source, a triac switch 242 connected to the second pin 2, the photo-field-effect transistor 244 connected to a photosensitive circuit 245, the photosensitive circuit 245 connected to the ninth pin 9, the eleventh pin 11, the twelfth pin 12, the thirteenth pin 13 and the fourteenth pin 14, a distance/sensitivity adjustment circuit 246 connected to the fifteenth pin 15 and the sixteenth pin 16, a time adjustment circuit 247 connected to the third pin 3 and the fourth pin 4, a light-depending resistor 248 connected to the sixth pin 6, the light-depending resistor 248 belonging to a light actuation circuit 249, and the light actuation circuit 249 actuating the whole circuit. The arc-shaped lens 23 reflects light to the photo-field-effect transistor 244 to actuate the electric circuit board 24. The triac switch 242 turns on a lamp 243. The distance/sensitivity adjustment circuit 246 has a first variable resistor VR1 adjusting the photosensitive distance and sensitivity of the photosensitive circuit 245. The time adjustment circuit 247 has a second variable resistor VR2 adjusting the actuation period of the triac switch 242. The light actuation circuit 249 has a third variable resistor VR3 adjusting the actuation period and mode of the light actuation circuit 249. When an article approaches the arc-shaped lens 23, the photosensitive circuit 245 can detect the article. Then the second pin 2 outputs a potential to actuate the triac switch 242.

The present invention has the following advantages. The arc-shaped lens can be positioned on a predetermined position. Therefore, the arc-shaped lens can reflect light to the photo-field-effect transistor precisely. The whole lighting fixture control device has a small volume. Thus the lighting fixture control device will not occupy a large room.

The invention is not limited to the above embodiment but various modification thereof may be made.

I claim:

1. A lighting fixture control device comprises:

a base casing, an upper cover covering the base casing, an arc-shaped lens disposed on the base casing, an electric circuit board disposed on a bottom of the upper cover, and a control integrated circuit chip disposed on a bottom of the electric circuit board, the electric circuit board having a photo-field-effect transistor, the base casing having a hollow interior, an arc-shaped slot formed on a periphery of the base casing matching the arc-shaped lens, two through holes formed on the periphery of the base casing, and a plurality of hollow seats disposed in a bottom of the base casing, two main wires passing through the bottom of the base casing and connected to the electric circuit board, the upper cover having an aperture formed on a top rim of the upper cover and a plurality of hollow posts disposed on the bottom of the upper cover matching the hollow seats, two branch wires passing through the aperture and connected to the electric circuit board, the arc-shaped lens inserted in the arc-shaped slot, each of the through holes receiving a cushion which receives an adjustment bolt.

2. A lighting fixture control device as claimed in claim 1, wherein the arc-shaped lens has a protrusion and two distal protruded plates inserted in the arc-shaped slot.

3. A lighting fixture control device as claimed in claim 1, wherein the control integrated circuit chip has a first pin, a second pin, a third pin, a fourth pin, a fifth pin, a sixth pin, a seventh pin, an eighth pin, a ninth pin, a tenth pin, an eleventh pin, a twelfth pin, a thirteenth pin, a fourteenth pin, a fifteenth pin, and a sixteenth pin.

4. A lighting fixture control device as claimed in claim 3, wherein the electric circuit board further comprises a power supply circuit in order to convert an AC source to a DC source, a triac switch connected to the second pin, the photo-field-effect transistor connected to a photosensitive circuit, the photosensitive circuit connected to the ninth pin, the eleventh pin, the twelfth pin, the thirteenth pin and the fourteenth pin, a distance/sensitivity adjustment circuit connected to the fifteenth pin and the sixteenth pin, a time adjustment circuit connected to the third pin and the fourth pin, a light-depending resistor connected to the sixth pin, and the light-depending resistor belonging to a light actuation circuit.

5. A lighting fixture control device as claimed in claim 4, wherein the distance/sensitivity adjustment circuit has a first variable resistor adjusting a photosensitive distance and sensitivity of the photosensitive circuit.

6. A lighting fixture control device as claimed in claim 4, wherein the time adjustment circuit has a second variable resistor adjusting the actuation period of the triac switch.

7. A lighting fixture control device as claimed in claim 4, wherein the light actuation circuit has a third variable resistor adjusting an actuation period of the light actuation circuit.

\* \* \* \* \*